(12) United States Patent
Tello Arias et al.

(10) Patent No.: US 12,734,888 B2
(45) Date of Patent: Sep. 15, 2026

(54) SOUND SYSTEM FOR INSTRUMENT PANEL OF VEHICLE

(71) Applicant: Ford Global Technologies, LLC, Dearborn, MI (US)

(72) Inventors: Armando Tello Arias, Ecatepec de Morelos (MX); Alejandra Matamoros Gutierrez, Mexico City (MX); Jose Angel Perez Bello, Mexico City (MX); Andrea Viviana Arregui Torres, Atizapán de Zaragoza (MX); David Hernandez Morfin, Mexico City (MX); Juan Ramon Mendoza Molina, Metepec (MX); Yoon Kim, Northville, MI (US); Thomas Junior Luckett, Saline, MI (US)

(73) Assignee: Ford Global Technologies, LLC

( * ) Notice: Subject to any disclaimer, the term of this patent is extended or adjusted under 35 U.S.C. 154(b) by 217 days.

(21) Appl. No.: 18/819,601

(22) Filed: Aug. 29, 2024

(65) Prior Publication Data

US 2026/0061847 A1 Mar. 5, 2026

(51) Int. Cl.

*B60K 37/20* (2024.01)
*B60K 35/22* (2024.01)
*B60K 35/26* (2024.01)
*B60S 1/02* (2006.01)

(52) U.S. Cl.

CPC .............. *B60K 37/20* (2024.01); *B60K 35/22* (2024.01); *B60K 35/26* (2024.01); *B60S 1/023* (2013.01)

(58) Field of Classification Search

CPC ........ B60K 35/26; B60K 37/20; B60K 35/22; H04R 2499/13
USPC .......................................................... 296/70
See application file for complete search history.

(56) References Cited

U.S. PATENT DOCUMENTS 4,267,993 A 5/1981 Shimizu et al.
4,896,373 A 1/1990 Blake
5,088,571 A * 2/1992 Burry .................. B60H 1/0055 296/70
6,639,988 B2 10/2003 Ashtiani et al.
7,251,507 B2 7/2007 Kitao et al.
7,397,405 B2 7/2008 Yamada et al.
7,503,622 B2 * 3/2009 Vican .................. B62D 25/145 296/70
8,170,265 B2 5/2012 Hagedorn-Maillard et al.
8,488,818 B2 * 7/2013 Biggs ..................... H04R 1/021 381/86
9,895,975 B2 * 2/2018 Lee ........................ B60K 35/22
10,730,557 B2 * 8/2020 Mullen ................ B62D 25/145
10,740,796 B2 8/2020 Brubaker
12,143,766 B2 * 11/2024 Summers ............... H04R 1/025
12,468,194 B2 * 11/2025 Larry ..................... B60K 35/10
2023/0101805 A1 3/2023 Sun et al.

* cited by examiner

*Primary Examiner* — Adam J Waggenspack
(74) *Attorney, Agent, or Firm* — Vichit Chea; Price Heneveld LLP

(57) ABSTRACT

An instrument panel includes a substrate, a topper panel, and a sound stage panel. The sound stage panel includes a surface that faces upwardly and rearwardly, and opposite end portions. Opposite end portions of the sound stage panel face inwardly towards a passenger space between the opposite end portions. The instrument panel further includes first and second speakers that are aligned with openings in the opposite end portions of the sound stage panel.

20 Claims, 9 Drawing Sheets

SOUND SYSTEM FOR INSTRUMENT PANEL OF VEHICLE

FIELD OF THE DISCLOSURE

The present disclosure generally relates to an instrument panel for a vehicle, and more specifically to an instrument panel that includes a floating display and inwardly facing speakers adjacent opposite ends of the instrument panel.

BACKGROUND OF THE DISCLOSURE

Various instrument panels and sound systems have been developed for motor vehicles. Known vehicles may include screens mounted in an instrument panel and one or more speakers positioned in various locations.

SUMMARY OF THE DISCLOSURE

An aspect of the present disclosure is an instrument panel for vehicles. The instrument panel includes a substrate that is configured to be secured to a vehicle body structure, a topper panel secured to the substrate, and a sound stage panel secured to the substrate. A lower edge of the sound stage panel extends along a forward portion of an upwardly facing surface of the topper panel. The sound stage panel includes a central portion having a curved surface that faces upwardly and rearwardly, and first and second opposite end portions that cover opposite end portions of the substrate. The first and second opposite end portions of the sound stage panel extend rearwardly, whereby surfaces of the first and second opposite end portions of the sound stage panel face inwardly towards a passenger space between the first and second opposite end portions of the sound stage panel. The instrument panel further includes first and second speakers that are mounted to the opposite end portions of the substrate. The first and second speakers are aligned with openings in the first and second opposite end portions of the sound stage panel.

Embodiments of the first aspect of the present disclosure can include any one or a combination of the following features:

- The instrument panel optionally includes a defroster panel that is secured to a front portion of the substrate. The topper panel may be secured to a rear portion of the substrate, and the substrate may include an upright step between front and rear portions of the substrate. The sound stage panel may be secured to the step of the substrate.
- The defroster panel may include vent openings that are configured to provide for upward flow of air out of the vent openings towards an inner surface of a windshield to defrost the windshield.
- Each opposite end portion of the substrate may include a pair of locating features. The instrument panel may include first and second brackets interconnecting the first and second speakers, respectively, to opposite end portions of the substrate. Each of the first and second brackets may include a pair of projections engaging the locating features of the substrate.
- The first and second brackets may each include: 1) a central support structure engaging the first and second speakers, respectively; and: 2) side structure extending upwardly from the central support structure on opposite sides thereof. Each side structure may include a forward portion and a projection extending rearwardly from the forward portion.

- Each pair of locating features may include a pin-receiving opening and a slot. Each pair of projections may include a pin that is received in the pin-receiving opening, and a tab that is received in the slot to prevent rotation of the bracket about the pin.
- Each side structure may include a fastener-receiving opening therethrough, and threaded fasteners may extend through the fastener-receiving openings and engage the substrate to secure the brackets to the substrate.
- The substrate may include a speaker-receiving opening and rearwardly-facing bracket engagement surfaces on the opposite sides of the speaker-receiving opening at each opposite end portion of the substrate. The central support structures of the brackets may be disposed in the speaker-receiving openings of the substrate. The side structure of the brackets may include end flaps, and the fastener-receiving openings may be formed in the end flaps. The end flaps may engage the bracket-engaging surfaces.
- A motor vehicle may include an instrument panel according to the present disclosure, wherein the motor vehicle includes a body structure defining a cabin having a front row of seats comprising side-by-side driver and passenger spaces behind the instrument panel, and a windshield extending upwardly and rearwardly over the vent openings of the defroster panel.
- The motor vehicle may include a floating dual horizon display array secured to the substrate by a pair of brackets that extend through openings in the sound stage panel.
- The floating dual horizon display array may include a curved display surface facing the front row of seats. The curved display surface may have a curvature that corresponds to a curvature of the curved surface of the central portion of the sound stage panel. The curved display surface may include a driver side portion in front of the driver space, and a passenger side portion in front of the passenger space.

Another aspect of the present disclosure is a motor vehicle including a body structure defining a cabin having a front row of seats. The motor vehicle further includes an instrument panel. The instrument panel includes a substrate secured to the body structure. The substrate incudes a front portion, a rear portion, and a central portion extending in a fore-aft direction between the front and rear portions. The instrument panel further includes a sound stage panel secured to the front portion of the substrate. The sound stage panel includes a central portion and first and second opposite end portions. The opposite end portions have surfaces that face inwardly towards the opposite ends of the front row of seats. First and second speakers are mounted to the substrate. The first and second speakers are lined with openings in the first and second opposite end portions of the sound stage panel. The motor vehicle further includes a floating dual horizon display disposed above the sound stage panel.

Embodiments of the second aspect of the present disclosure can include any one or a combination of the following features:

- The motor vehicle may optionally include a topper panel secured to the central portion of the substrate.
- The central portion of the sound stage panel may have a concave central surface, and the first and second opposite end portions of the sound stage panel may include transitions at opposite ends of the central portions. The transitions may have concave transition surfaces, wherein a curvature of the transition surfaces is greater than a curvature of the central surface.

Each opposite end portion of the substrate may include a pair of locating features, and first and second brackets may interconnect the first and second speakers, respectively, to the opposite end portions of the substrate. Each of the first and second brackets may include a pair of projections, wherein each projection engages a respective locating feature.

The first and second brackets may each include: 1) a central support structure engaging the first and second speakers, respectively; and: 2) a side structure extending outwardly away from the central support structure on the opposite sides thereof. Each side structure may include a forward portion and a projection extending rearwardly from the forward portion.

Each pair of locating features may include an opening and a slot. Each pair of projections may include a pin that is received in the opening and a tab that is received in the slot to prevent rotation of the bracket about the pin.

The substrate may include a speaker-receiving opening and rearwardly-facing bracket engagement surfaces on the opposite sides of the speaker-receiving opening at each opposite end portion of the substrate. The central support structures of the brackets may be disposed in the speaker-receiving openings of the substrate. The side structures of the brackets may include end flaps, and the fastener-receiving openings may be formed in the end flaps. The end flaps may engage the bracket-engaging surfaces.

The floating dual horizon display may be secured to the substrate by a pair a brackets that extend through openings in the sound stage panel. The floating dual horizon display array may include a curved display surface facing the front row of seats. The curved display surface may have curvature that corresponds to a curvature of the curved surface of the central portions of the sound stage panel. The curved display surface may include a driver side portion in front of the driver space, and a passenger side portion in front of the passenger space.

Another aspect of the present disclosure is a method of providing a motor vehicle with an instrument panel. The method includes securing a substrate to a vehicle body structure in front of a first row of seats in a cabin of the motor vehicle. A topper panel is secured to the substrate, and a sound stage panel is also secured to the substrate. A central curved surface of the sound stage panel faces upwardly and rearwardly, and surfaces of first and second opposite end portions of the sound stage panel face inwardly towards opposite ends of the first row of seats. The method further includes mounting first and second speakers to opposite end portions of the substrate in alignment with openings in the first and second opposite end portions of the sound stage panel.

The method may include securing a floating dual horizon display array to the substrate utilizing a pair of brackets that extend through openings in the sound stage panel. The floating dual horizon display array may include a curved display surface facing the front row of seats, wherein the curved display surface has a curvature that corresponds to a curvature of the curved surface of the central portion of the sound stage panel. The curved display surface may include a driver side portion in front of the driver space, and a passenger side portion in front of the passenger space.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 7; FIG. 7.

DETAILED DESCRIPTION OF PREFERRED EMBODIMENTS

Figure 1:
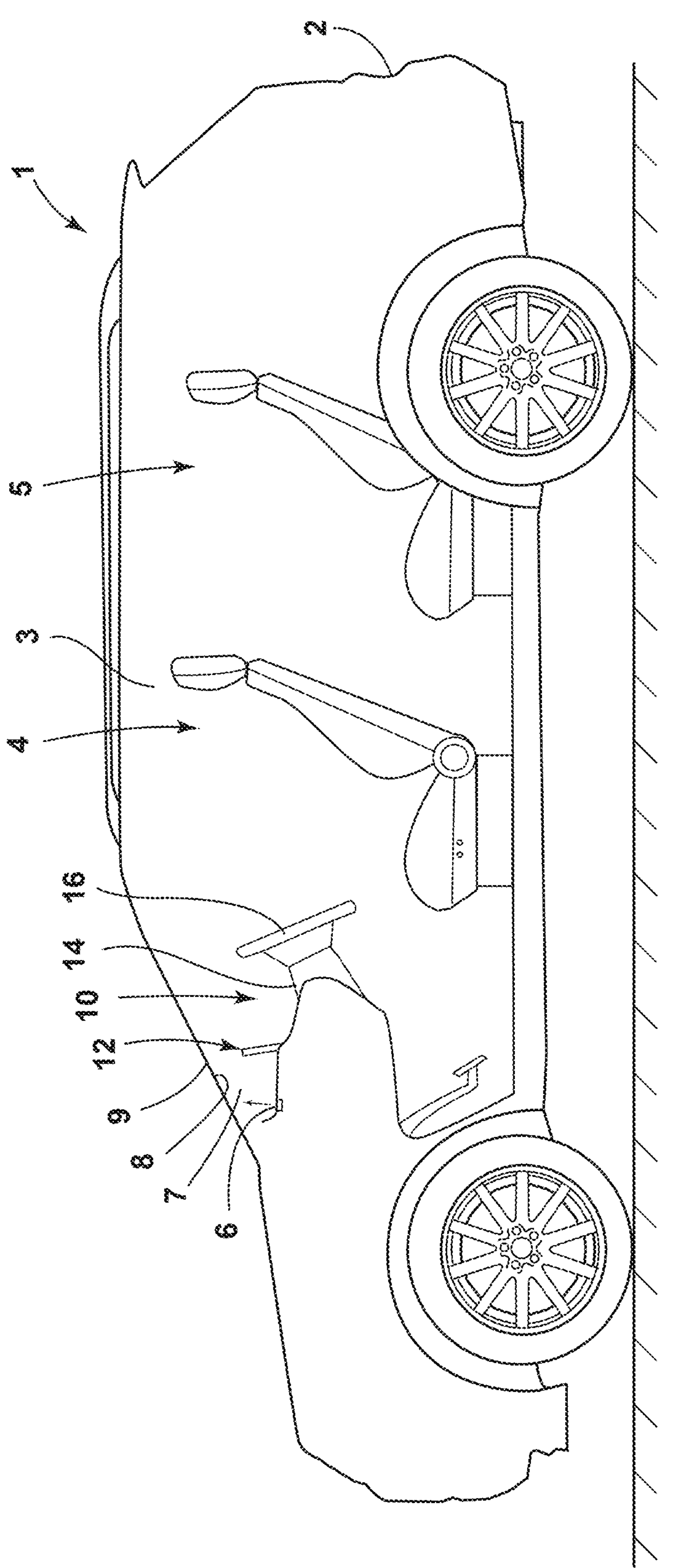
FIG. 1 is a partially schematic side elevational view of a motor vehicle having an instrument panel according to an aspect of the present disclosure.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle instrument panel. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the terms "or" and "and/or," when used in a list of two or more items, means that any one of the listed items can be employed by itself, or any combination of two or more of the listed items can be employed. For example, if a composition or device is described as containing or comprising components A, B, or C, the composition or device can contain (include) A alone; B alone; C alone; A and B in combination; A and C in combination; B and C in combination; or A, B, and C in combination. If a composition or device is described as containing or comprising components A and/or B and/or C, the composition or device can contain (include) A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," "including" or any other variation thereof, are intended to cover a non-exclusive inclusion, such that a process, method, article, or apparatus that includes or comprises a list of elements does not include only those elements but may include other elements not expressly listed or inherent to such process, method, article, or apparatus. An element preceded by "comprises . . . a" or "includes . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

With reference to FIG. 1, a motor vehicle 1 according to an aspect of the present disclosure may include a body structure 2 forming a cavity 3. The cavity 3 may include a first row of seats 4, a second row of seats 5 and a third row of seats (not shown). An instrument panel 10 may be secured to the body structure 2 in front of the first row of seats 4. As discussed in more detail below, the instrument panel 10 may include a vent opening 6 that permits defrost air 7 to flow upwardly towards inside surface 8 of windshield 9. Instrument panel 10 may also include a floating dual horizon display 12 that is positioned above an upper surface 14 of the instrument panel 10. Vehicle 1 may include various operator inputs such as a steering wheel 16, which may be positioned in front of a driver's position (driver space) of first row 4 of seats.

Figure 2:
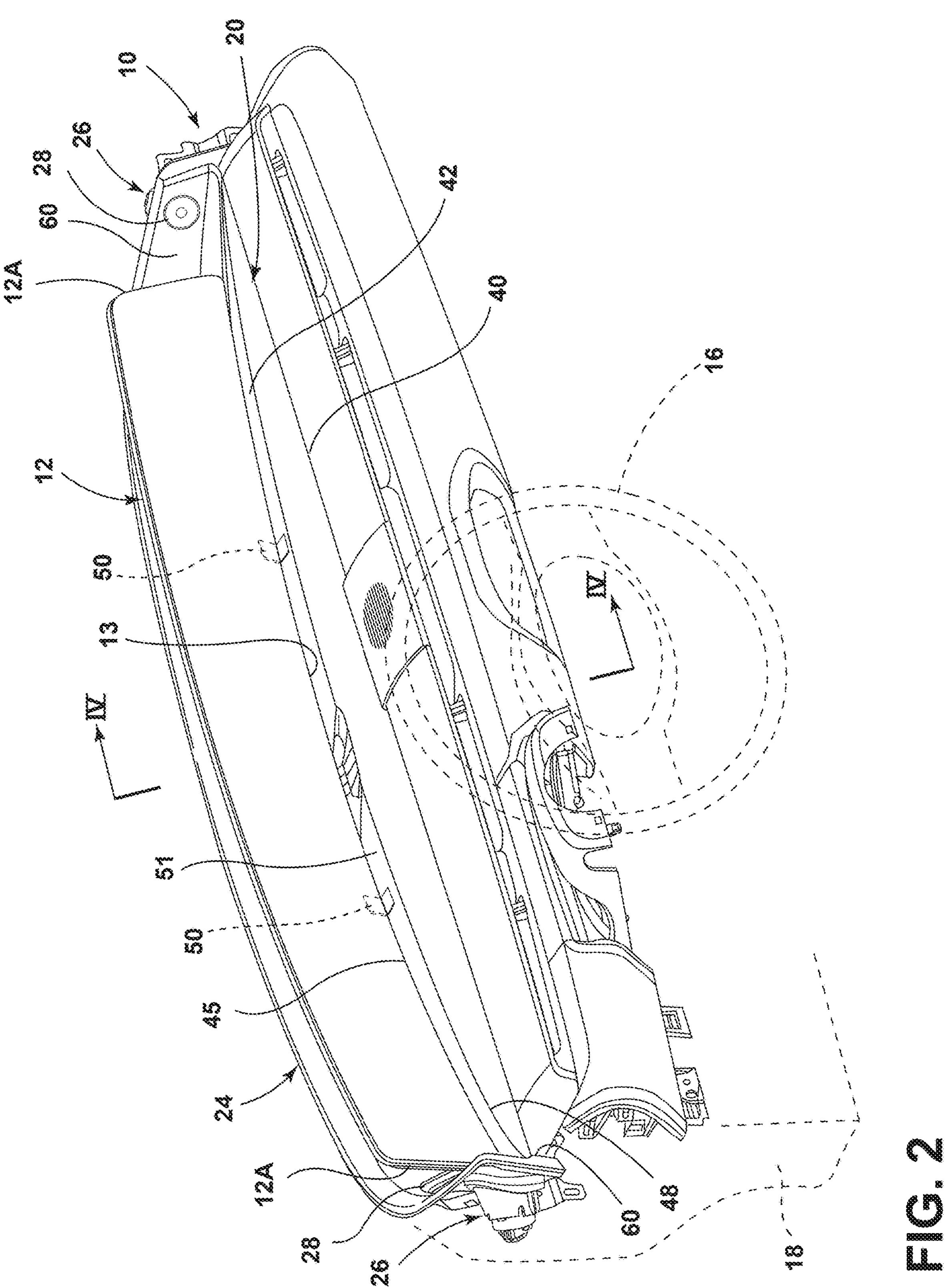
FIG. 2 is a perspective view of an instrument panel according to an aspect of the present disclosure.
Figure 3:
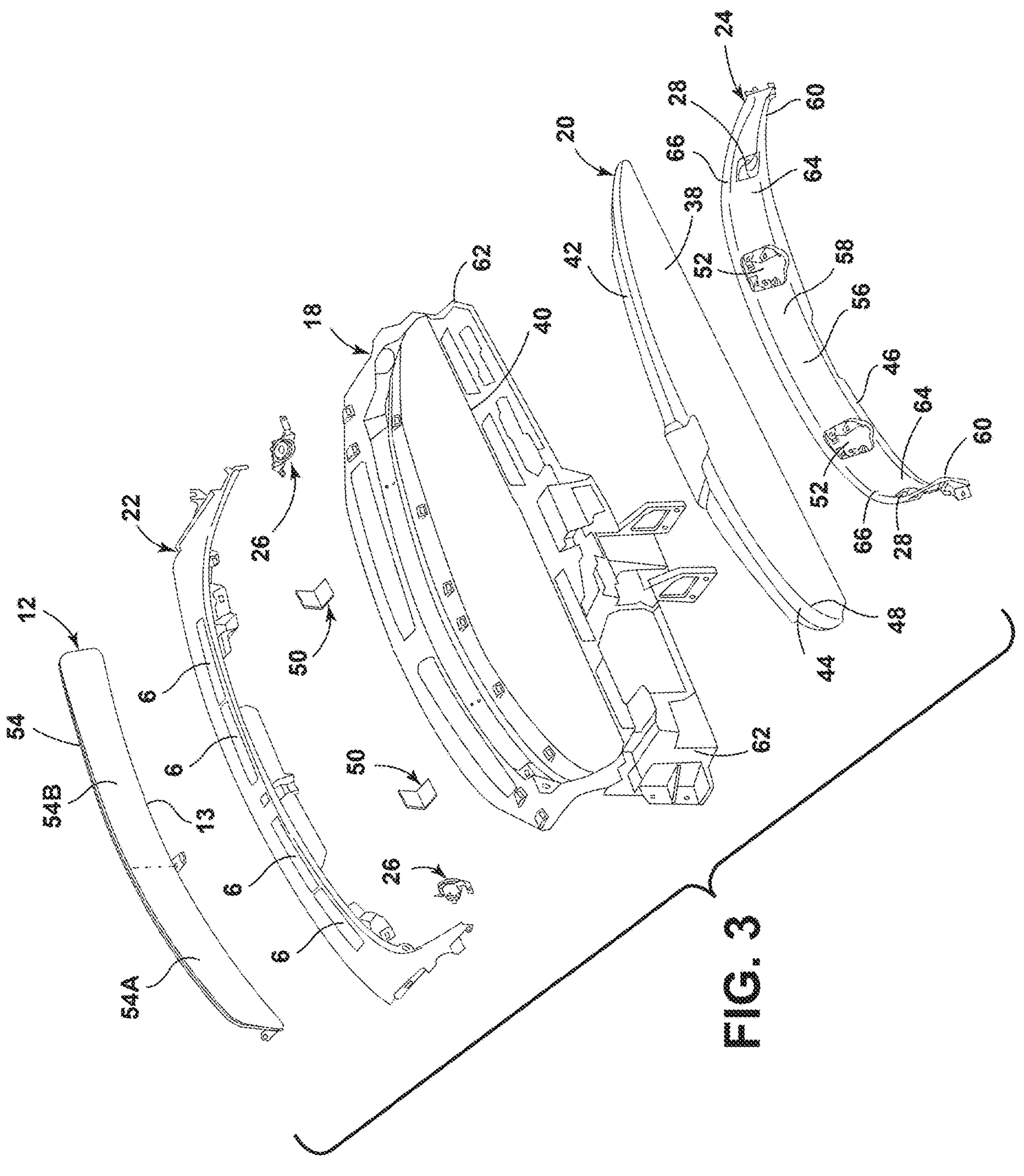
FIG. 3 is an exploded perspective view of the instrument panel of FIG. 2.
Figure 4:
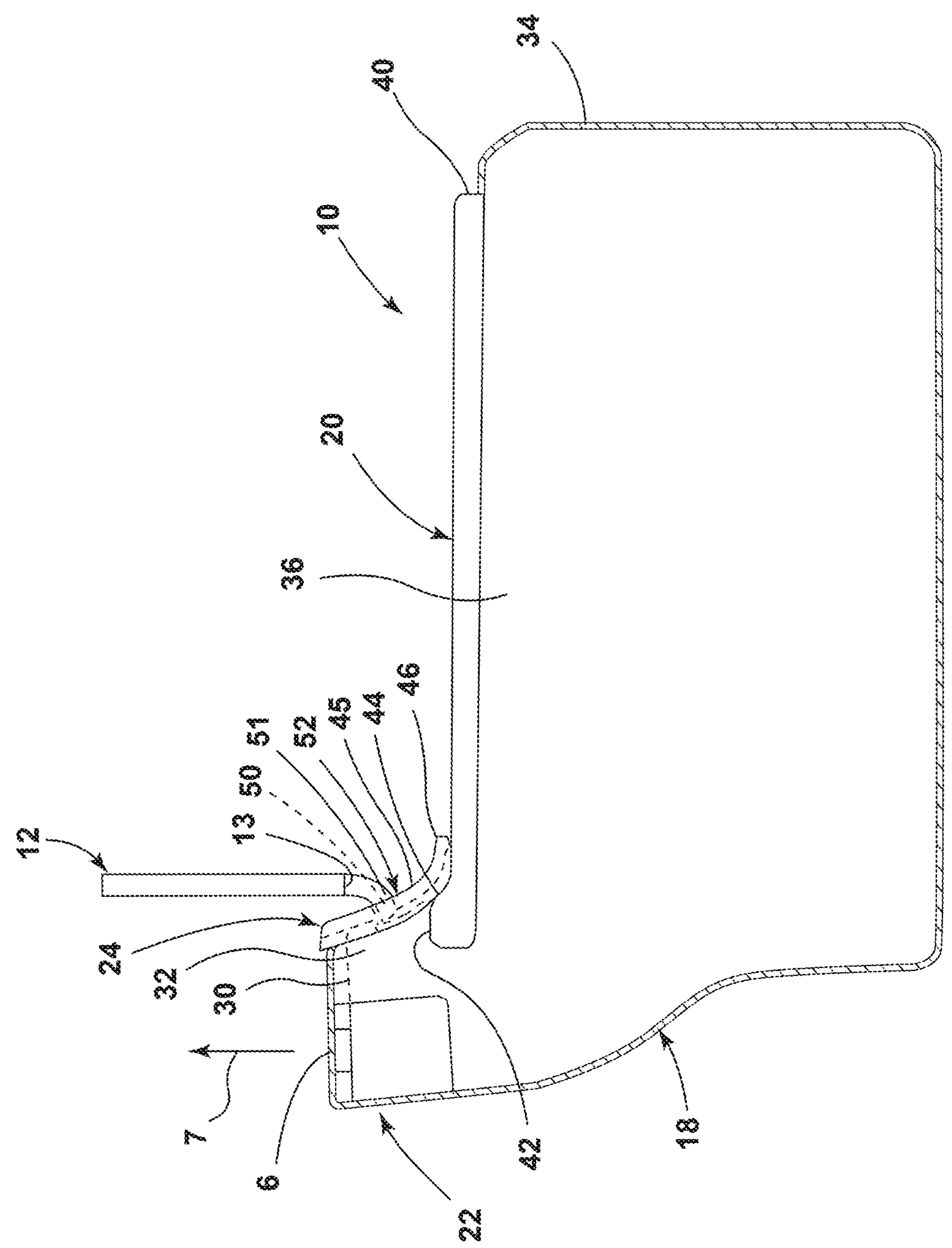
FIG. 4 is a cross-sectional view of the instrument panel of FIG. 2 taken along the line IV-IV.

With reference to FIGS. 2-4, instrument panel 10 includes a substrate 18, a topper panel 20, a defroster panel 22, and a sound stage panel 24. As discussed in more detail below, when assembled, speakers 26 may be positioned in alignment with openings 28 of sound stage panel 24.

When assembled, IP substrate 18 may be secured to body structure 2 utilizing conventional fasteners (not shown) or the like. The substrate 18 includes a forward portion 30, a step 32, a rear portion 34, and a central portion 36 that extends between a lower portion 32A of step 32 and rear portion 34 of substrate 18. Topper panel 20 may be secured to central portion 36 of substrate 18. Topper panel 20 may include an upwardly facing surface 38 that extends between a rear edge 40 of topper panel 40, and a raised forward portion 42 of topper panel 20. Raised forward portion 42 of topper panel 20 may have a curved surface 42 having a curvature that corresponds to a curvature of lower edge 46 of sound stage panel 24, whereby lower edge 46 of sound stage panel 24 fits closely against curved surface 44 of raised forward portion 42 of topper panel 20. The surface 38 of topper panel 20 may have a linear rear edge 40 and a curved front edge 48 (FIG. 3) at the junction between surfaces 38 and 44.

Instrument panel 10 may include a defroster panel 22 that may be secured to a front portion of substrate 18 utilizing conventional fasteners, brackets, or the like (not shown).

A dual display 12 may be mounted to substrate 18 by brackets 50. The brackets 50 may extend through openings 52 (FIG. 3) in sound stage panel 24. A lower edge 13 of display 12 may be spaced apart from upper surface 45 to form a gap 51 whereby display 12 "floats" above portions of instrument panel 10. The floating dual screen 12 may include a curved display surface facing the front row seats 4 (FIG. 1). The display surface may include a driver side portion 54A in front of the driver space, and a passenger side portion 54B in front of the passenger space. The display 12 may be configured to provide images, texts, and the like on display surface 54. Display surface 54 may optionally comprise a touch screen surface whereby a driver or occupant of motor vehicle 1 can utilize the dual screen 12 to provide user inputs. A curvature of display surface 54 may have a curvature that corresponds to a curved surface 56 of a curved central portion 58 of sound stage panel 24.

Referring again to FIGS. 2A and 3, sound stage panel 24 may include opposite end portions 60 that cover opposite end portions 62 of substrate 18. The first and second opposite end portions 60 of sound stage panel 24 may extend rearwardly whereby surfaces 64 of end portions 60 face inwardly towards a passenger space of cabin 3. The passenger space may include the first row 4 of seats (FIG. 1). Surface 56 of sound stage panel 24 may include transitions 66 having an increased radius of curvature that are greater than a curvature of surface 56 along a curved central portion 58 of sound stage panel 24. The opposite end portions 60 of sound stage panel 20 may extend beyond the opposite ends 12A (FIG. 2) of display 12 such that the display 12 does not interfere with sound from speakers 26. The positioning of the speakers 26 permits the audio from speakers 26 to be oriented towards passengers positioned in first row of seats 4 to intensify the immersive environmental experience, and provide substantially the same audio experience for the driver and co-driver.

Figure 2A:
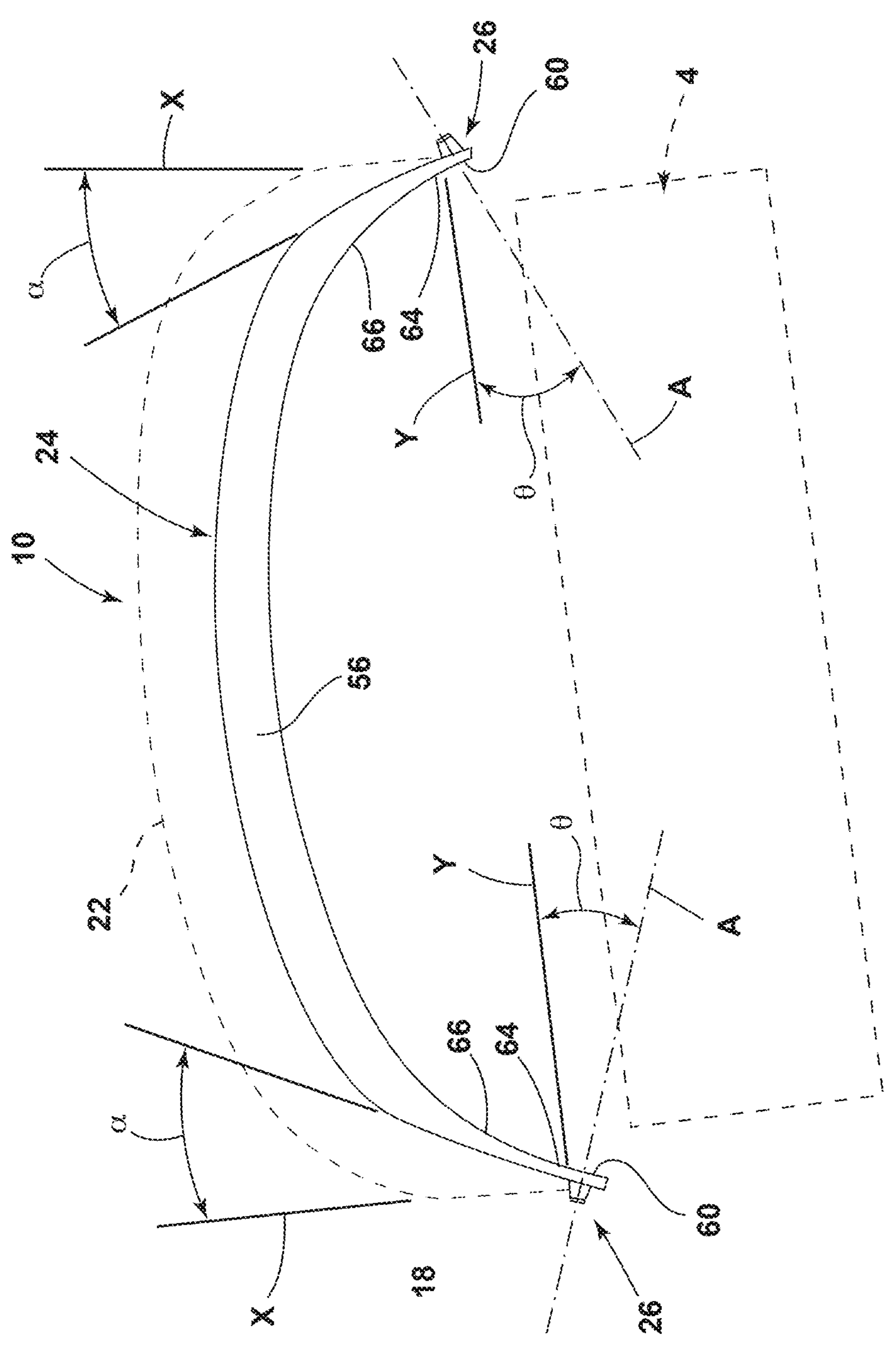
FIG. 2A is a partially schematic plan view of the instrument panel of FIG. 2.
Figure 6:
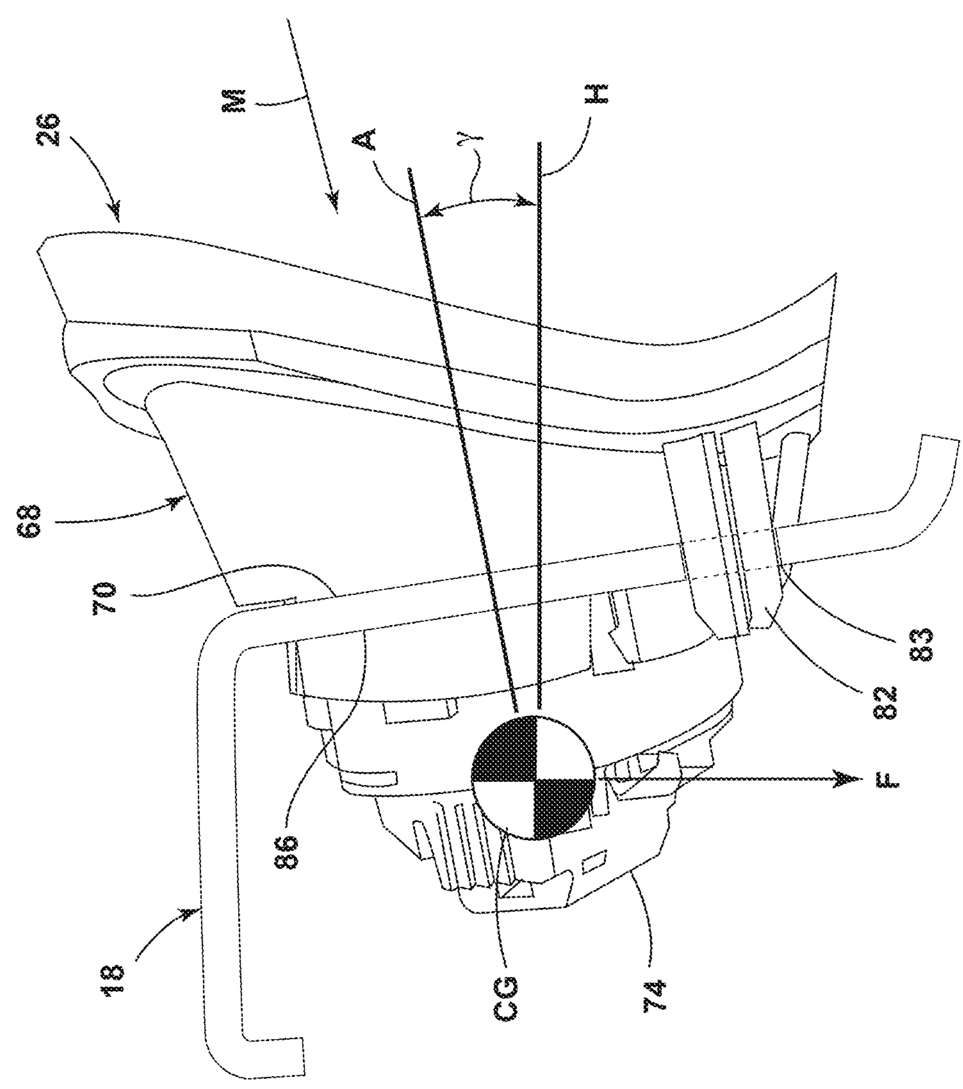
FIG. 6 is a side view of the speaker of FIG. 5.
Figure 7:
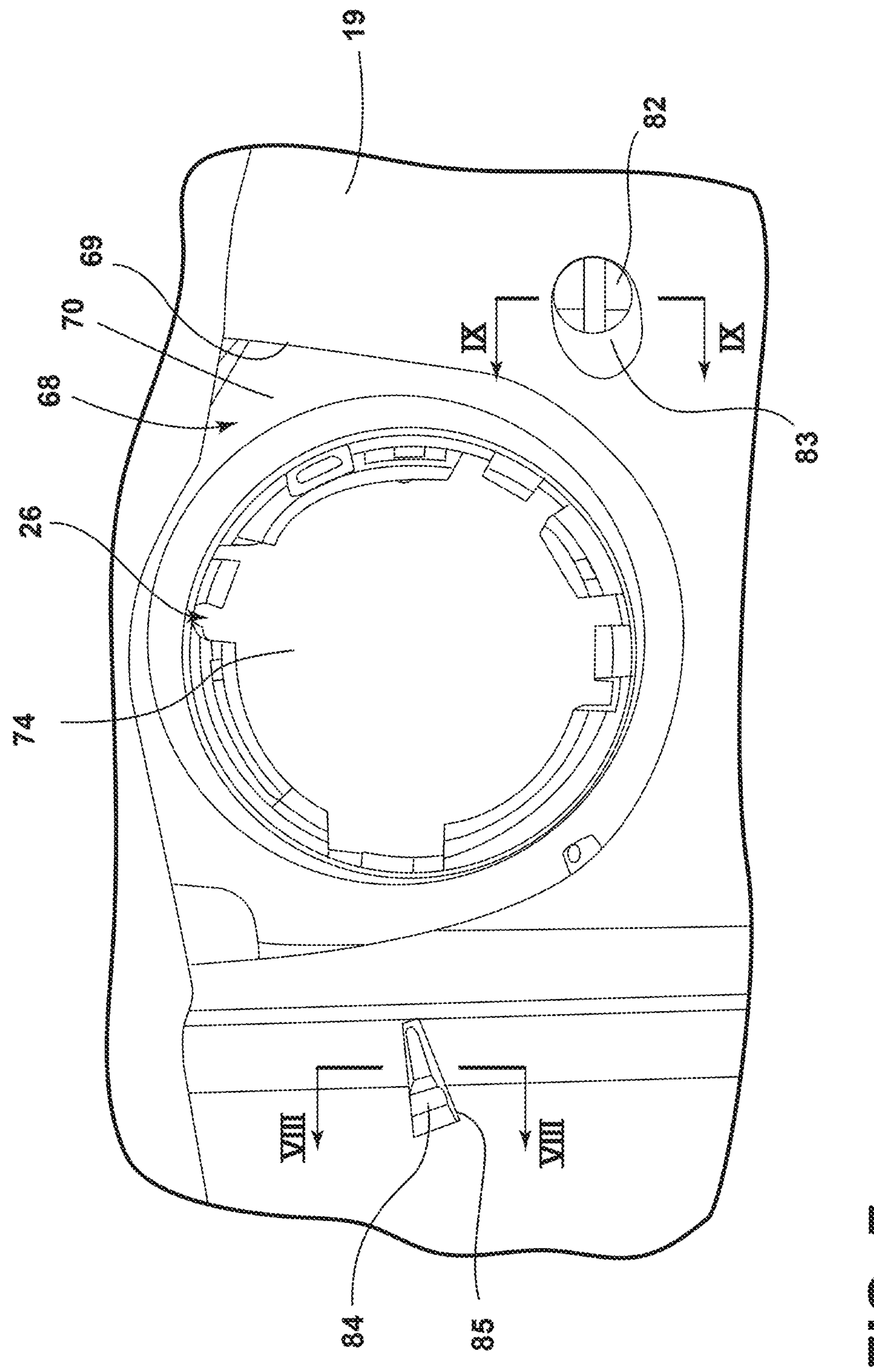
FIG. 7 is a partially fragmentary view showing locating features of the speaker bracket of FIG. 5 engaging a substrate of an instrument panel.
Figure 9:
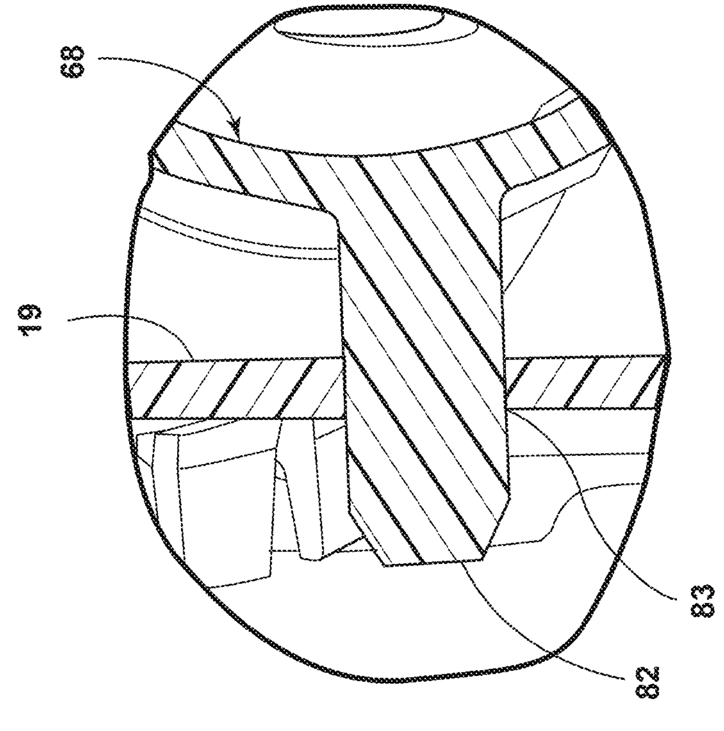
FIG. 9 is a partially fragmentary cross-sectional view taken along the line VII-VII.
Figure 8:
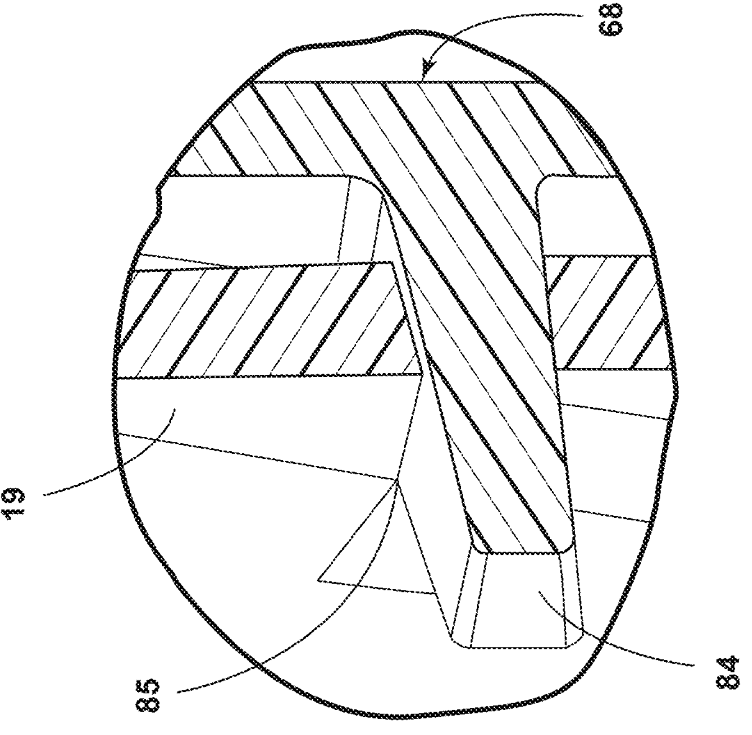
FIG. 8 is a partially fragmentary cross-sectional view taken along the line VI-VI.

With reference to FIG. 2A, surfaces 64 of end portions 60 of sound stage panel 24 form an angle α relative to a fore-aft direction "X" of vehicle 1. Angle α may be less than 90°, and is preferably about 10°-45°, but may be zero. The axes "A" of speakers 26 may form an angle θ relative to a side-to-side direction "Y" of vehicle 1. In general, sound from speakers 26 may be directed in the direct of axes A. However, it will be understood that speakers 26 may produce both an axis sound and of axis sound. Axes A may optionally be perpendicular or approximately perpendicular to surfaces 64. Angle θ may, alternatively, be somewhat larger whereby the axis A of speakers 26 is not perpendicular to surfaces 64. As shown in FIG. 6, the axes of speakers 26 may be angled upwardly at an angle γ relative to a horizontal plane "H" of vehicle 1 to direct sound from speakers 26 towards the ears of passengers in first row of seats 4. Angle γ is an acute angle, and may be zero. In general angle γ may be about 10° to about 45°. However, any suitable angle γ may be utilized.

Figure 5:
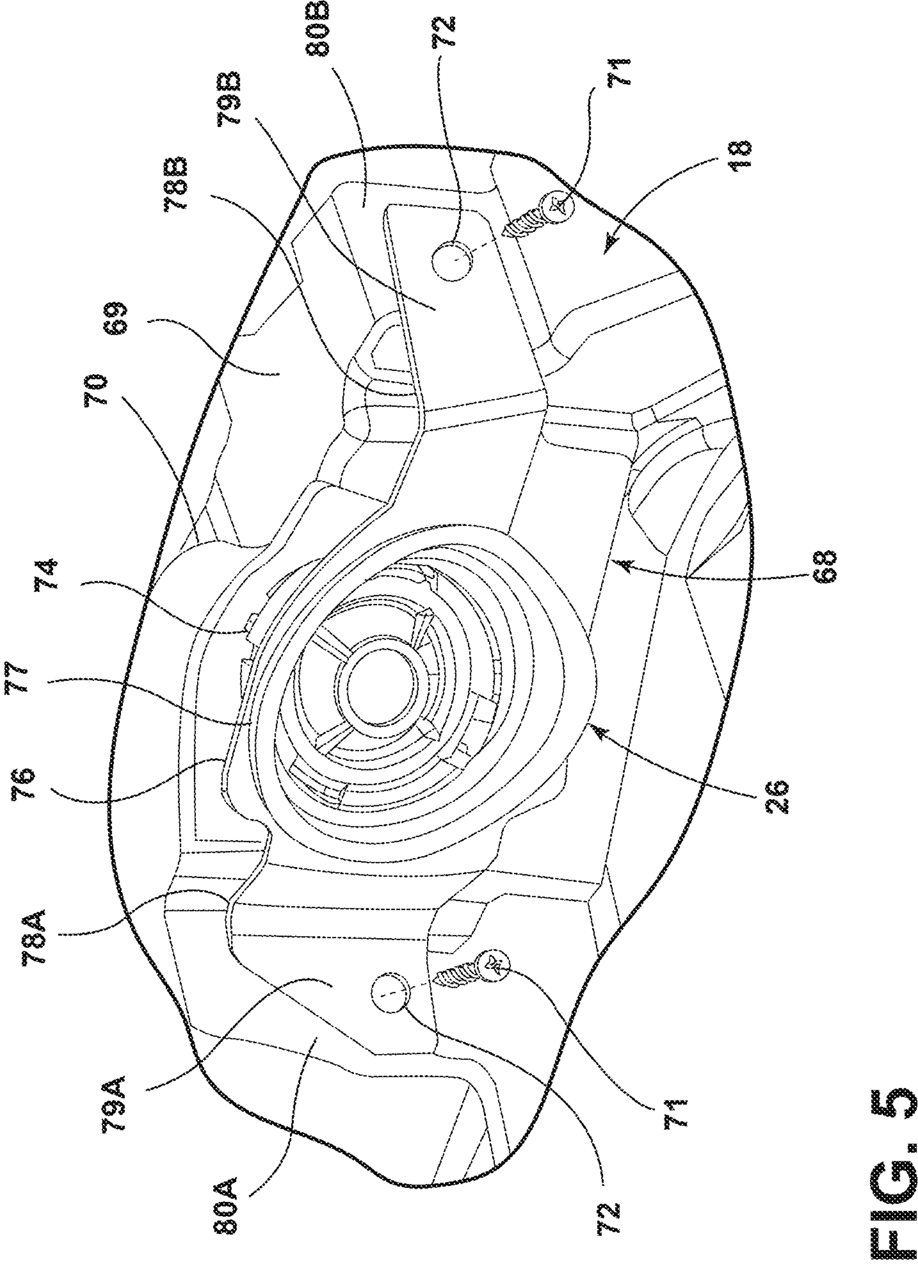
FIG. 5 is a partially fragmentary perspective view of a speaker and mounting bracket according to an aspect of the present disclosure.

With further reference to FIGS. 5 and 6, speakers 26 may be secured to substrate 18 by brackets 68. The speaker 26 and bracket 68 of FIGS. 5-9 comprise the passenger side speaker 26. The driver's side speaker 26 may be mounted utilizing a bracket that is a mirror image of bracket 68, and a detailed description of the driver's side bracket 68 is therefore not believed to be required.

Brackets 68 are secured to substrate 18 utilizing screws 71 or other suitable fasteners that extend through openings 72 of brackets 68. Screws 71 may engage threaded nuts of a known type (not shown). When speakers 26 are installed, a rear portion 74 extends through opening 70 in substrate 18. An edge 69 may extend around opening 70. Brackets 68 may include a central portion 76 having an opening 77 that receives a portion of the speaker 26. Brackets 68 may further include side structures such as outwardly extending portions 78A and 78B with transverse flaps 79A and 79B. The flaps 79A and 79B may configured to fit closely against surfaces 80A and 80B, respectively, of substrate 18.

During assembly, the speaker 26 is first joined to the bracket 68, and the bracket 68 is then shifted in the direction of the arrow "M" (FIG. 6) into opening 70 of substrate 18. Movement of bracket 68 causes a first rearwardly extending projection such as pin 82 to be received in a pin-receiving opening 83 of substrate 19 (see also FIG. 7), and also causes a second rearwardly extending projection such tab 84 of bracket 68 to be received in a slot 85 of substrate 19 (see also FIGS. 8 and 9). Positioning pin 82 in opening 83 limits movement of bracket 68 relative to substrate 18 whereby bracket 68 is limited to pivoting about pin 82. However, positioning tab 84 in slot 85 limits rotational movement of bracket 68 relative to the substrate 19. Thus, the engagement of pin 82 and tab 84 in openings 83 and 85, respectively, positions bracket 68 and speaker 26 relative to the substrate 19 to facilitate securing bracket 68 to substrate 18 utilizing screws 71 (FIG. 5). Also, with reference to FIG. 6, the center of gravity (CG) of the combined speakers 26 and brackets 68 result in a downward gravitational force "F" that is behind an upright portion 86 of substrate 18 in the vicinity of opening 70, whereby the speaker 26 and bracket 68 is stably positioned on substrate 18 prior to installation of screws 71.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An instrument panel for vehicles having a first row of passenger space, the instrument panel comprising:

a substrate configured to be secured to a vehicle body structure;

a topper panel secured to the substrate;

a sound stage panel secured to the substrate, wherein a lower edge of the sound stage panel extends along a forward portion of an upwardly facing surface of the topper panel, the sound stage panel including a central portion having a curved surface that faces upwardly and rearwardly, and first and second opposite end portions that cover opposite end portions of the substrate, and wherein the first and second opposite end portions of the sound stage panel extend rearwardly whereby surfaces of the first and second opposite end portions of the sound stage panel face are configured to face inwardly towards the first row passenger space; and first and second speakers mounted to the opposite end portions of the substrate, wherein the first and second speakers are aligned with openings in the first and second opposite end portions of the sound stage panel, and axes of the first and second speakers face inwardly towards the first row passenger space.

2. The instrument panel of claim 1, including:

a defroster panel secured to a front portion of the substrate; and wherein:

the topper panel is secured to a rear portion of the substrate;

the substrate includes an upright step between front and rear portions of the substrate; and the sound stage panel is secured to the step of the substrate.

3. The instrument panel of claim 2, wherein:

the defroster panel includes vent openings that are configured to provide for upward flow of air out of the vent openings towards an inner surface of a windshield to defrost the windshield.

4. The instrument panel of claim 1, wherein:

each opposite end portion of the substrate includes a pair of locating features; and including:

first and second brackets interconnecting the first and second speakers, respectively, to the opposite end portions of the substrate, each of the first and second brackets including a pair of projections engaging the locating features.

5. The instrument panel of claim 4, wherein:

the first and second brackets each include: 1) a central support structure engaging the first and second speakers, respectively; and: 2) side structure extending outwardly away from the central support structure on opposite sides thereof; and wherein each side structure includes a forward portion and a projection extending rearwardly from the forward portion.

6. The instrument panel of claim 5, wherein:

each pair of locating features includes a pin-receiving opening and a slot; and each pair of projections includes a pin that is received in the pin-receiving opening and a tab that is received in the slot to prevent rotation of the bracket about the pin.

7. The instrument panel of claim 6, wherein:

each side structure has a fastener-receiving opening therethrough; and including:

threaded fasteners extending through the fastener-receiving openings and engaging the substrate to secure the brackets to the substrate.

8. The instrument panel of claim 7, wherein:

the substrate includes a speaker-receiving opening and rearwardly-facing bracket engagement surfaces on opposite sides of the speaker-receiving opening at each opposite end portion of the substrate; and the central support structures of the brackets are disposed in the speaker-receiving openings of the substrate;

the side structures of the brackets include end flaps, and the fastener-receiving openings are formed in the end flaps; and the end flaps engage the bracket-engaging surfaces.

9. A motor vehicle including the instrument panel of claim 3, wherein:

the motor vehicle includes a body structure defining a cabin having a front row of seats comprising side-by-side driver and passenger spaces behind the instrument panel, and a windshield extending upwardly and rearwardly over the vent openings of the defroster panel.

10. The motor vehicle of claim 9, including:

a floating dual horizon display array secured to the substrate by a pair of brackets that extend through openings in the sound stage panel, wherein a lower edge of the floating dual horizon display array is spaced apart from an upper surface of the instrument panel to form a gap.

11. The motor vehicle of claim 10, wherein:

the floating dual horizon display array includes a curved display surface facing the front row of seats, wherein the curved display surface has a curvature corresponding to a curvature of the curved surface of the central portion of the sound stage panel;

wherein the curved display surface includes a driver side portion in the front of the driver space, and a passenger side portion in front of the passenger space.

12. A motor vehicle comprising:

a body structure defining a cabin having a front row of seats; and an instrument panel including:

a substrate secured to the body structure, the substrate including a front portion, a rear portion, and a central portion extending in a fore-aft direction between the front and rear portions;

a sound stage panel secured to the front portion of the substrate, the sound stage panel including a central portion and first and second opposite end portions having surfaces that face inwardly towards opposite ends of the front row of seats;

first and second speakers mounted to the substrate, wherein the first and second speakers are aligned with openings in the first and second opposite end portions of the sound stage panel; and a floating dual horizon display disposed above the sound stage panel to form a gap between a lower edge of the floating dual horizon display and a surface of the sound stage panel.

13. The motor vehicle of claim 12, including:

a topper panel secured to the central portion of the substrate.

14. The motor vehicle of claim 13, wherein:

the central portion of the sound stage panel has a concave central surface; and the first and second opposite end portions include transitions at opposite ends of the central portions, the transitions having concave transition surfaces, wherein a curvature of the transition surfaces is greater than a curvature of the central surface.

15. The motor vehicle of claim 14, wherein:

the first and second brackets each include: 1) a central support structure engaging the first and second speakers, respectively; and: 2) side structure extending outwardly away from the central support structure on opposite sides thereof; and wherein each side structure includes a forward portion and a projection extending rearwardly from the forward portion.

16. The motor vehicle of claim 15, wherein:

each pair of locating features includes an opening and a slot; and each pair of projections includes a pin that is received in the opening and a tab that is received in the slot to prevent rotation of the bracket about the pin.

17. The motor vehicle of claim 16, wherein:

the substrate includes a speaker-receiving opening and rearwardly-facing brackets engagement surfaces on opposite sides of the speaker-receiving opening at each opposite end portion of the substrate;

the central support structures of the brackets are disposed in the speaker-receiving openings of the substrate;

the side structures of the brackets include end flaps, and the fastener-receiving openings are formed in the end flaps; and the end flaps engage the bracket-engaging surfaces.

18. The motor vehicle of claim 9, wherein:

the floating dual horizon display array is secured to the substrate by a pair of brackets that extend through openings in the sound stage panel;

the floating dual horizon display array includes a curved display surface facing the front row of seats, wherein the curved display surface has a curvature that corresponds to a curvature of the curved surface of the central portion of the sound stage panel; and wherein the curved display surface includes a driver side portion in the front of the driver space, and a passenger side portion in front of the passenger space.

19. A method of providing a motor vehicle with an instrument panel, the method comprising:

securing a substrate to a vehicle body structure in front of a first row of seats in a cabin of the motor vehicle;

securing a topper panel to the substrate;

securing a sound stage panel to the substrate with a central curved surface of the sound stage panel facing upwardly and rearwardly, and surfaces of first and second opposite end portions of the sound stage panel facing inwardly towards opposite ends of the first row of seats; and mounting first and second speakers to opposite end portions of the substrate in alignment with openings in the first and second opposite end portions of the sound stage panel.

20. The method of claim 19, including:

securing a floating dual horizon display array to the substrate utilizing a pair of brackets that extend through openings in the sound stage panel;

wherein the floating dual horizon display array includes a curved display surface facing the front row of seats, wherein the curved display surface has a curvature that corresponds to a curvature of the curved surface of the central portion of the sound stage panel; and wherein the curved display surface includes a driver side portion in the front of the driver space, and a passenger side portion in front of the passenger space.

* * * * *